US012592935B2

(12) United States Patent
Heikkinen et al.

(10) Patent No.: US 12,592,935 B2
(45) Date of Patent: Mar. 31, 2026

(54) SYSTEM TO PRESENT CONTEXT BASED CREATIVE TOOL

(71) Applicant: Snap Inc., Santa Monica, CA (US)

(72) Inventors: Christie Marie Heikkinen, Santa Monica, CA (US); Jane Meng, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 202 days.

(21) Appl. No.: 18/082,849

(22) Filed: Dec. 16, 2022

(65) Prior Publication Data

US 2024/0205234 A1    Jun. 20, 2024

(51) Int. Cl.
*H04L 9/40* (2022.01)
*G06F 16/587* (2019.01)

(52) U.S. Cl.
CPC .......... *H04L 63/107* (2013.01); *G06F 16/587* (2019.01); *H04L 63/102* (2013.01)

(58) Field of Classification Search
CPC .............................. G06F 16/587; H04L 63/102
USPC ............................................................. 726/4
See application file for complete search history.

(56) References Cited

U.S. PATENT DOCUMENTS

| | | | | |
|---|---|---|---|---|
| 11,533,318 | B1 * | 12/2022 | Osterkamp | ........... H04L 63/102 |
| 11,775,162 | B1 * | 10/2023 | De Leon | ............. G06F 3/04883 |
| | | | | 715/833 |
| 11,995,651 | B2 * | 5/2024 | Kapoor | .............. G06Q 20/3267 |
| 2013/0085861 | A1 * | 4/2013 | Dunlap | .............. G06Q 30/0251 |
| | | | | 705/14.58 |
| 2016/0294799 | A1 * | 10/2016 | Miller | .............. H04N 21/43072 |
| 2017/0185254 | A1 * | 6/2017 | Zeng | ..................... G06Q 10/101 |
| 2018/0107797 | A1 * | 4/2018 | Schuck | ................... G16H 40/20 |
| 2019/0204838 | A1 * | 7/2019 | Haque | ..................... G05D 1/248 |
| 2019/0310767 | A1 * | 10/2019 | König | .................... G06F 40/106 |
| 2023/0025943 | A1 * | 1/2023 | Karatzoglou | .......... G16H 20/70 |
| 2024/0135434 | A1 * | 4/2024 | Dollens | .............. G06Q 30/0643 |
| 2024/0430564 | A1 * | 12/2024 | Manzari | ............... H04N 23/633 |

FOREIGN PATENT DOCUMENTS

WO    WO-2020264184 A1 * 12/2020    ......... G06F 3/04817

* cited by examiner

*Primary Examiner* — Lan Dai T Truong
(74) *Attorney, Agent, or Firm* — SCHWEGMAN LUNDBERG & WOESSNER, P.A.

(57) ABSTRACT

A system for providing context based creative tools and configured to perform operations that include: causing display of first media content at a client device, the first media content comprising a media attribute; detecting the media attribute of the first media content; presenting a graphical icon based on the media attribute of the media content at the client device; receiving an input that selects the graphical icon; and generating second media content at the client device based on the input that selects the graphical icon.

17 Claims, 10 Drawing Sheets

108

110

100

MESSAGING CLIENT

APPLICATION SERVERS

202     EPHEMERAL TIMER SYSTEM

204     COLLECTION MANAGEMENT SYSTEM     CURATION INTERFACE

208

206     AUGMENTATION SYSTEM

210     MAP SYSTEM

212     GAME SYSTEM

214     CONTEXTUAL CREATIVE TOOL SYSTEM

CAUSING DISPLAY OF FIRST MEDIA CONTENT AT A CLIENT DEVICE, THE FIRST MEDIA CONTENT COMPRISING A MEDIA ATTRIBUTE
302

DETECTING THE MEDIA ATTRIBUTE OF THE FIRST MEDIA CONTENT
304

PRESENTING A GRAPHICAL ICON BASED ON THE MEDIA ATTRIBUTE OF THE MEDIA CONTENT AT THE CLIENT DEVICE
306

RECEIVING AN INPUT THAT SELECTS THE GRAPHICAL ICON
308

GENERATING SECOND MEDIA CONTENT AT THE CLIENT DEVICE BASED ON THE INPUT THAT SELECTS THE GRAPHICAL ICON
310

FIG. 3

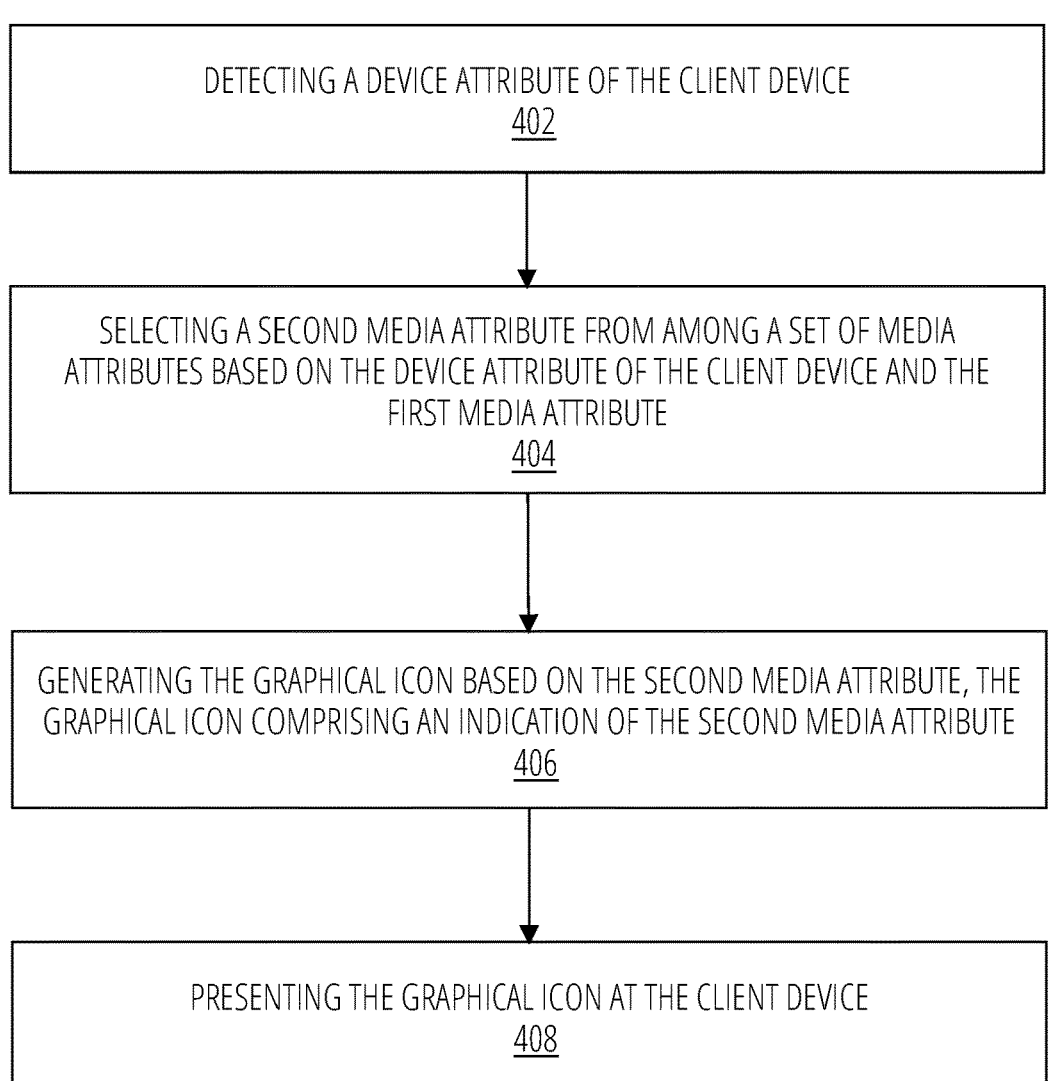

DETECTING A DEVICE ATTRIBUTE OF THE CLIENT DEVICE
402

SELECTING A SECOND MEDIA ATTRIBUTE FROM AMONG A SET OF MEDIA ATTRIBUTES BASED ON THE DEVICE ATTRIBUTE OF THE CLIENT DEVICE AND THE FIRST MEDIA ATTRIBUTE
404

GENERATING THE GRAPHICAL ICON BASED ON THE SECOND MEDIA ATTRIBUTE, THE GRAPHICAL ICON COMPRISING AN INDICATION OF THE SECOND MEDIA ATTRIBUTE
406

PRESENTING THE GRAPHICAL ICON AT THE CLIENT DEVICE
408

FIG. 4

SYSTEM TO PRESENT CONTEXT BASED CREATIVE TOOL

BACKGROUND

A front-facing camera, commonly known as a selfie camera, is a common feature of cameras, mobile phones, smartphones, tablets, laptops, and some handheld video game consoles. While stand-alone cameras face forward, away from the operator, tablets, smartphones and similar mobile devices typically have a camera facing the operator to allow taking a self-portrait photograph or video while looking at the display of the device, usually showing a live preview of the image.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 3 is a flowchart depicting a method for providing a contextual creative tool, in accordance with one embodiment.

FIG. 4 is a flowchart depicting a method for providing a contextual creative tool, in accordance with one embodiment.

DETAILED DESCRIPTION

Figure 1:
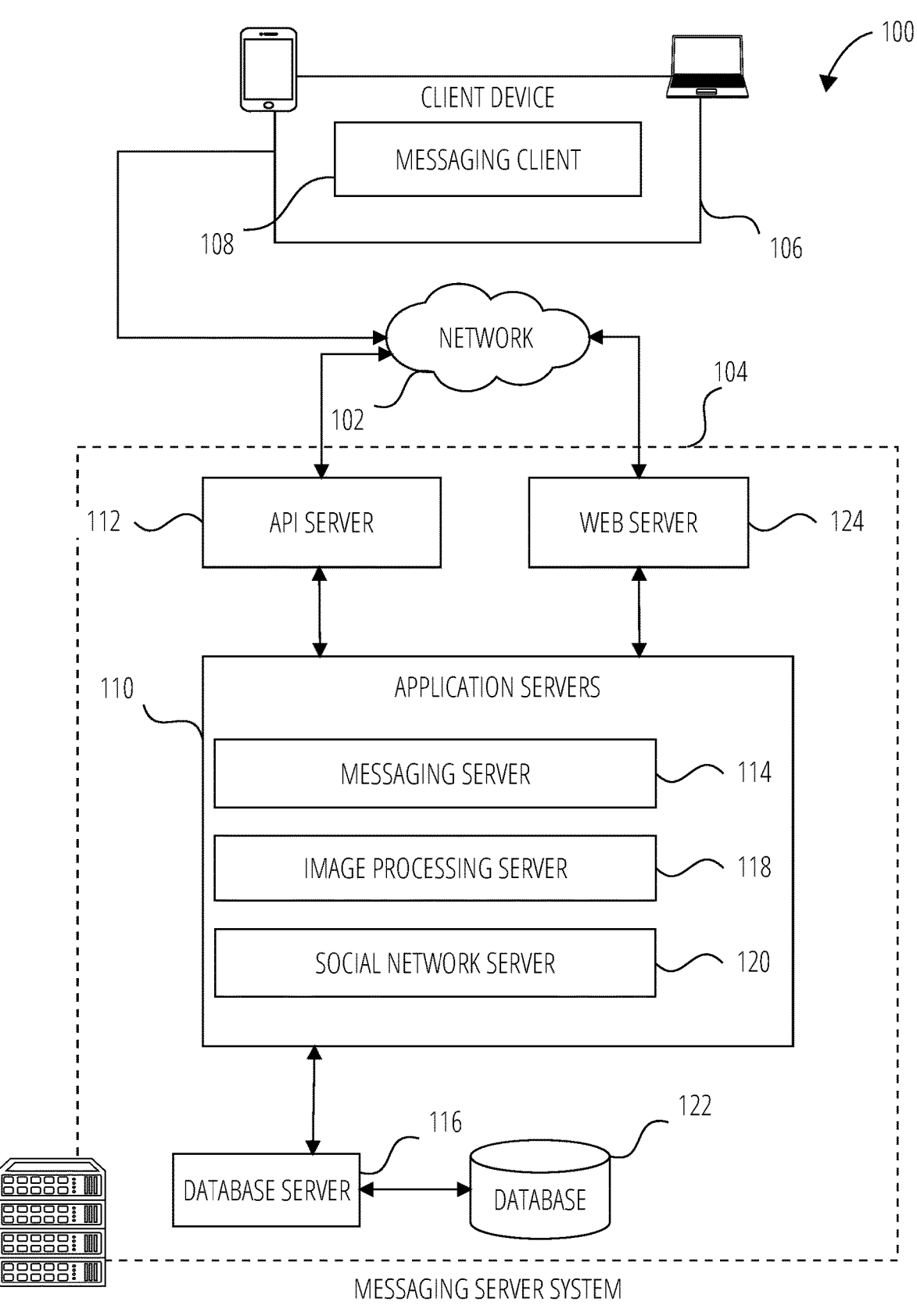
FIG. 1 is a diagrammatic representation of a networked environment in which the present disclosure may be deployed, in accordance with some examples.

As discussed above, cameras, mobile phones, smartphones, tablets, laptops, and some handheld video game consoles may include front-facing cameras, wherein the front-facing camera faces the operator to allow taking a self-portrait photograph or video while looking at the display of the device. User's of social media applications may generate media using one or more creative tools that utilize the front-facing camera, in order to share or otherwise distribute the media to one or more recipients.

According to certain example embodiments, a system for providing context based creative tools is described herein. The system may be configured to perform operations that include: causing display of first media content at a client device, the first media content comprising a media attribute; detecting the media attribute of the first media content; presenting a graphical icon based on the media attribute of the media content at the client device; receiving an input that selects the graphical icon; and generating second media content at the client device based on the input that selects the graphical icon.

According to certain example embodiments, the media attribute may include a creative tool utilized to generate the first media content, wherein the creative tool may include a creative tool from among a suite of creative tools. For example, in some embodiments, the creative tool may include a camera mode associated with the first media content, wherein the camera mode includes a dual camera mode, wherein the dual camera mode wherein a front-facing camera and rearward facing camera are both activated.

According to certain example embodiments, the graphical icon presented at the client device may include an indication of the media attribute associated with the first media content. The system may detect one or more media attributes associated with the first media content, wherein the one or more media attributes include creative tools associated with the first media content. For example, the creative tools may include a camera mode associated with the first media content, as well as a media filter associated with the first media content. Accordingly, the system may generate the graphical icon based on the media attributes, wherein the graphical icon comprises a display of an indication of a media attribute from among the one or more media attributes associated with the first media content. As an illustrative example, the first media content may include media content generated using a camera mode, wherein the camera mode comprises a dual camera mode wherein image data generated by a front-facing camera and rearward facing camera are simultaneously presented within a GUI. Accordingly, the graphical icon presented by the system may include an indicator that identifies the dual camera mode.

In some embodiments, the indication of the media attribute presented within the graphical icon may be based on one or more contextual factors. For example, the contextual factors may include user profile data, as well as device attributes associated with the client device. Consider an illustrative example from a user perspective, wherein a user of a client device receives first media content to be presented at the client device, and wherein the first media content comprises media attributes that include a creative tool associated with the first media content.

Accordingly, responsive to presenting the first media content at the client device, the system detects the media attributes associated with the first media content, wherein the media attributes include a first media attribute that corresponds with a creative tool. The system may then detect a device attribute associated with the client device, in order to determine whether or not the client device is capable of executing the creative tool. For example, the creative tool may require the client device to include a front-facing camera, or the ability to activate multiple cameras simultaneously.

Responsive to detecting the device attribute of the client device, the system may select a second media attribute from among a plurality of media attributes, based on the device attribute associated with the client device. For example, the second media attribute may include a creative tool executable by the client device based on the device attribute of the client device. The system may present the graphical icon at the client device, wherein the graphical icon includes an indication of the second media attribute.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
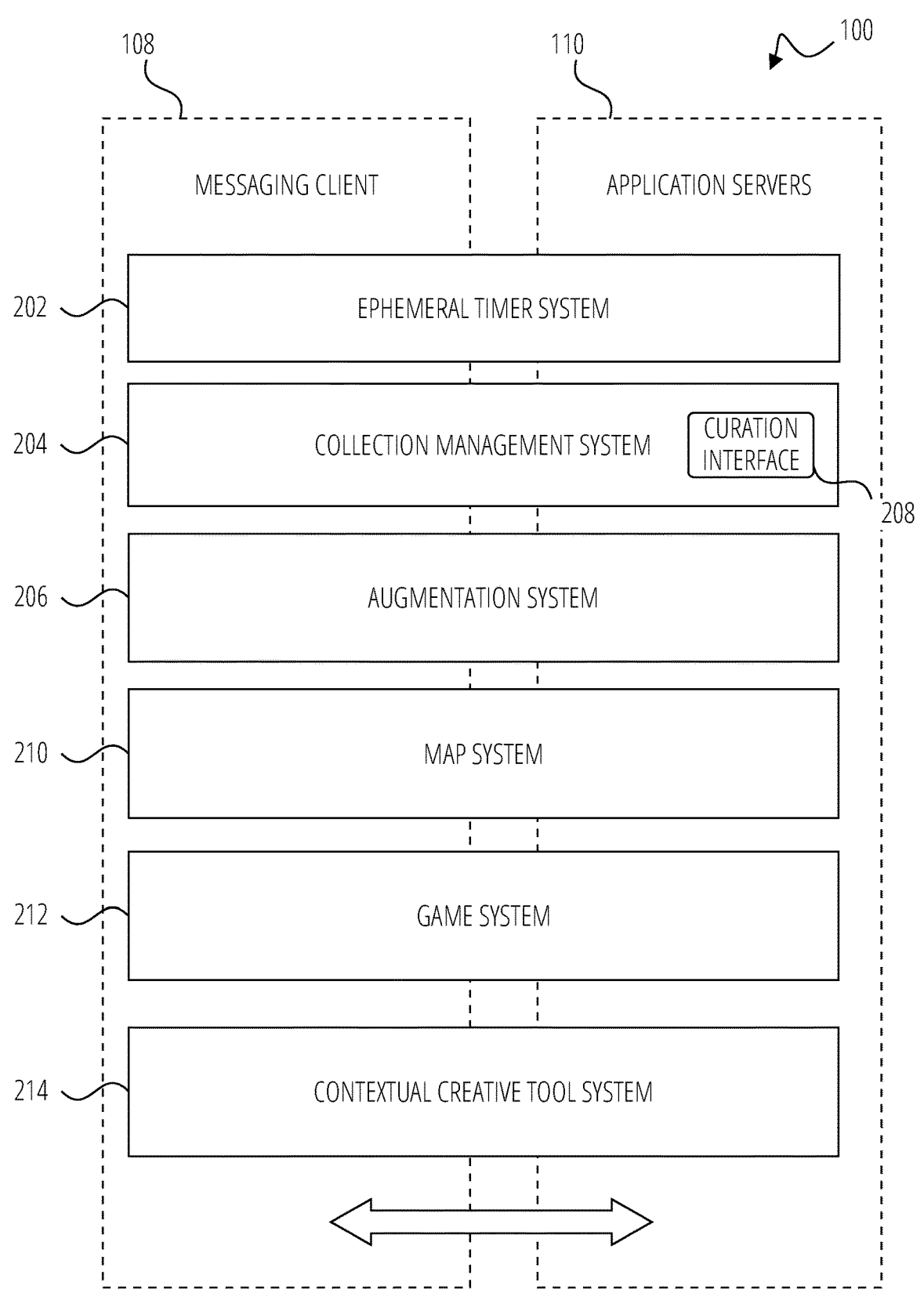
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a contextual creative tool system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display)

to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

According to certain embodiments, the contextual creative tool system 214 provides functions that may include: causing display of first media content at a client device, the first media content comprising a media attribute; detecting the media attribute of the first media content; presenting a graphical icon based on the media attribute of the media content at the client device; receiving an input that selects the graphical icon; and generating second media content at the client device based on the input that selects the graphical icon.

FIG. 3 is a flowchart illustrating operations of a contextual creative tool system 214 in performing a method 300 for providing a contextual creative tool, in accordance with one embodiment. Operations of the method 300 may be performed by one or more subsystems of the messaging system 100 described above with respect to FIG. 2, such as the contextual creative tool system 214. As shown in FIG. 3, the method 300 includes one or more operations 302, 304, 306, 308, and 310.

At operation 302, the contextual creative tool system 214 causes display of first media content at a client device 106, wherein the first media content comprises a media attribute. For example, the media attribute may include a creative tool associated with the first media content, such as a camera mode. At operation 304, the system detects the media attribute of the first media content.

At operation 306, the system presents a graphical icon based on the media attribute of the media content at the client device 106. For example, the graphical icon may include an indication of the media attribute associated with the first media content. In some embodiments, the graphical icon may be presented at a position upon the first media content, as depicted in the interface diagram 500 of FIG. 5, or within a chat interface, as depicted in the interface diagram 600 of FIG. 6.

At operation 308, the contextual creative tool system 214 receives an input from the client device 106, wherein the input comprises a selection of the graphical icon. For example, a user of the client device 106 may provide a tactile input that selects the graphical icon.

At operation 310, the contextual creative tool system 214 generates second media content at the client device 106 responsive to the input that selects the graphical icon, based on the media attribute associated with the first media content.

FIG. 4 is a flowchart illustrating operations of a contextual creative tool system 214 in performing a method 400 for providing a contextual creative tool, in accordance with one embodiment. Operations of the method 400 may be performed by one or more subsystems of the messaging system 100 described above with respect to FIG. 2, such as the contextual creative tool system 214. As shown in FIG. 4, the method 400 includes one or more operations 402, 404, 406, and 408. In some embodiments, operations of the method 400 may be performed as a precursor or subroutine of one or more operations of the method 300, such as operations 304 and 306.

At operation 402, the contextual creative tool system 214 detects a device attribute of the client device 106. The device attribute may include a device type, an operating system (OS), a version number of an application executed by the client device 106, as well as an indication of one or more hardware components associated with the client device 106 (i.e., camera type(s)). For example, the device attribute may provide an indication of one or more functional capabilities of the client device 106, such as whether or not the client device 106 can execute one or more creative tools from among a suite of creative tools.

In some embodiments, the contextual creative tool system 214 may perform operation 402 responsive to detecting the media attribute of the first media content presented at the client device 106, as in operation 304 of the method 300. Accordingly, the media attribute of the first media content may be a first media attribute from among a plurality of media attributes, and wherein the first media attribute may include a creative tool from among a plurality of creative tools utilized to generate the first media attribute. For example, the creative tool may include a camera mode, wherein the camera mode requires specific hardware.

At operation 404, the contextual creative tool system 214 selects a second media attribute from among a set of media attributes based on the device attribute of the client device 106 and the first media attribute associated with the first media content. For example, the second attribute may include a creative tool from among the plurality of creative tools, wherein the creative tool is executable by the client device 106 based on the device attributes of the client device 106. As an illustrative example, the first media attribute of the first media item may include a creative tool, wherein the creative tool requires a specific set of device attributes in order to be performed by a client device, such as the client device 106. The device attribute of the client device 106 may however indicate that the client device 106 does not have the hardware or required attributes necessary to execute the creative tool.

Accordingly, the contextual creative tool systems 214 may access a second media attribute from among a plurality of media attributes, wherein the second media attribute comprises a creative tool that is executable by the client device 106, and which may be similar to the first media attribute of the first media content.

At operation 406, the contextual creative tool system 214 generates the graphical icon to be displayed at the client device 106 based on the second media attribute selected from among the plurality of media attributes. For example, the graphical icon may include a display of an indication of the second media attribute.

At operation 408, the contextual creative tool system 214 causes display of a presentation of the graphical icon at the client device 106. The interface diagram 500 depicted in FIG. 5 provides an illustrative example of a graphical icon 514 presented at a position upon the first media content, and the interface diagram 600 of FIG. 6 provides an illustrative example of a graphical icon 608 presented at a position within a chat interface.

Figure 5:
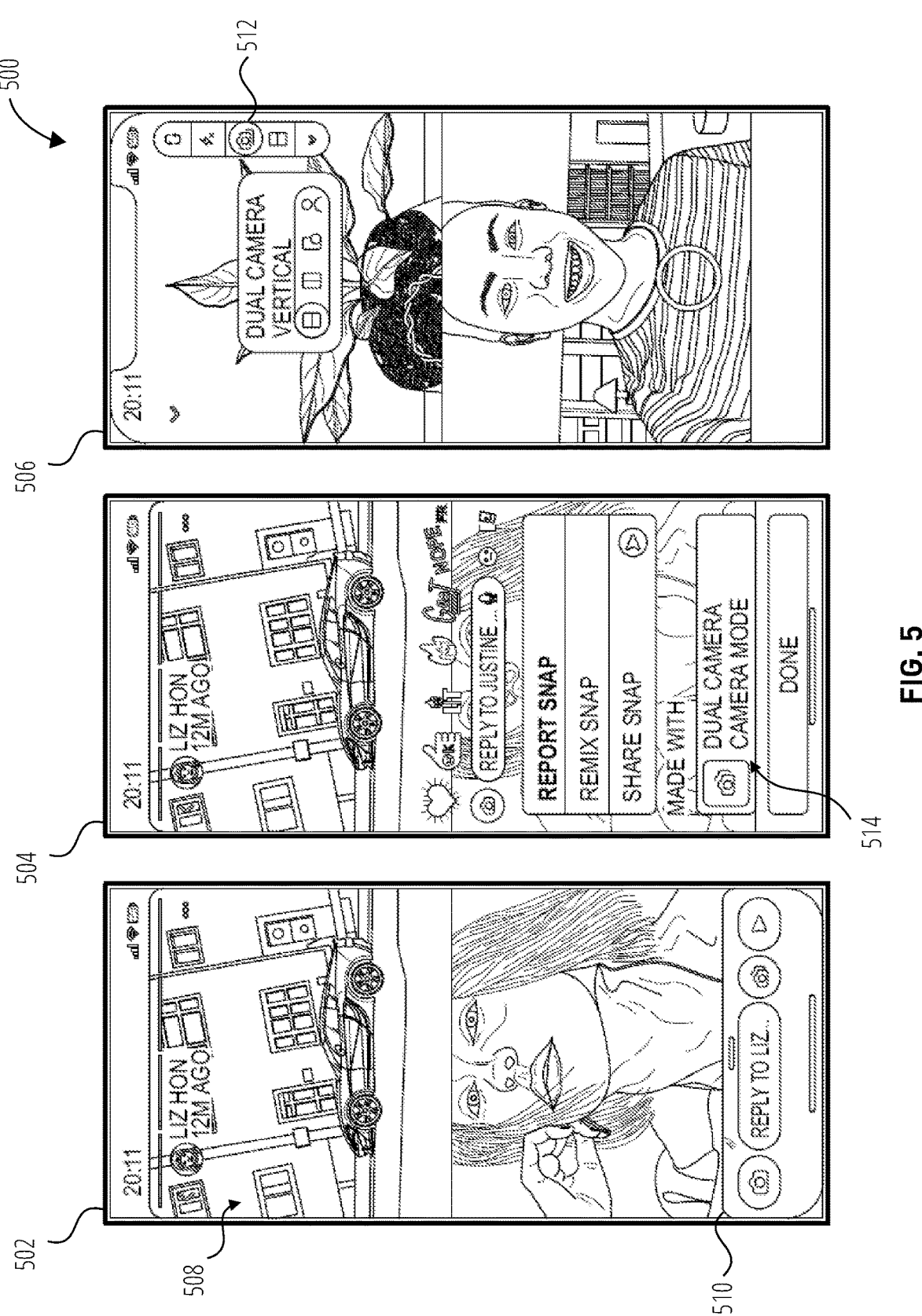
FIG. 5 is a flow diagram depicting graphical user interfaces (GUI) to display a contextual creative tool, in accordance with one embodiment.
Figure 6:
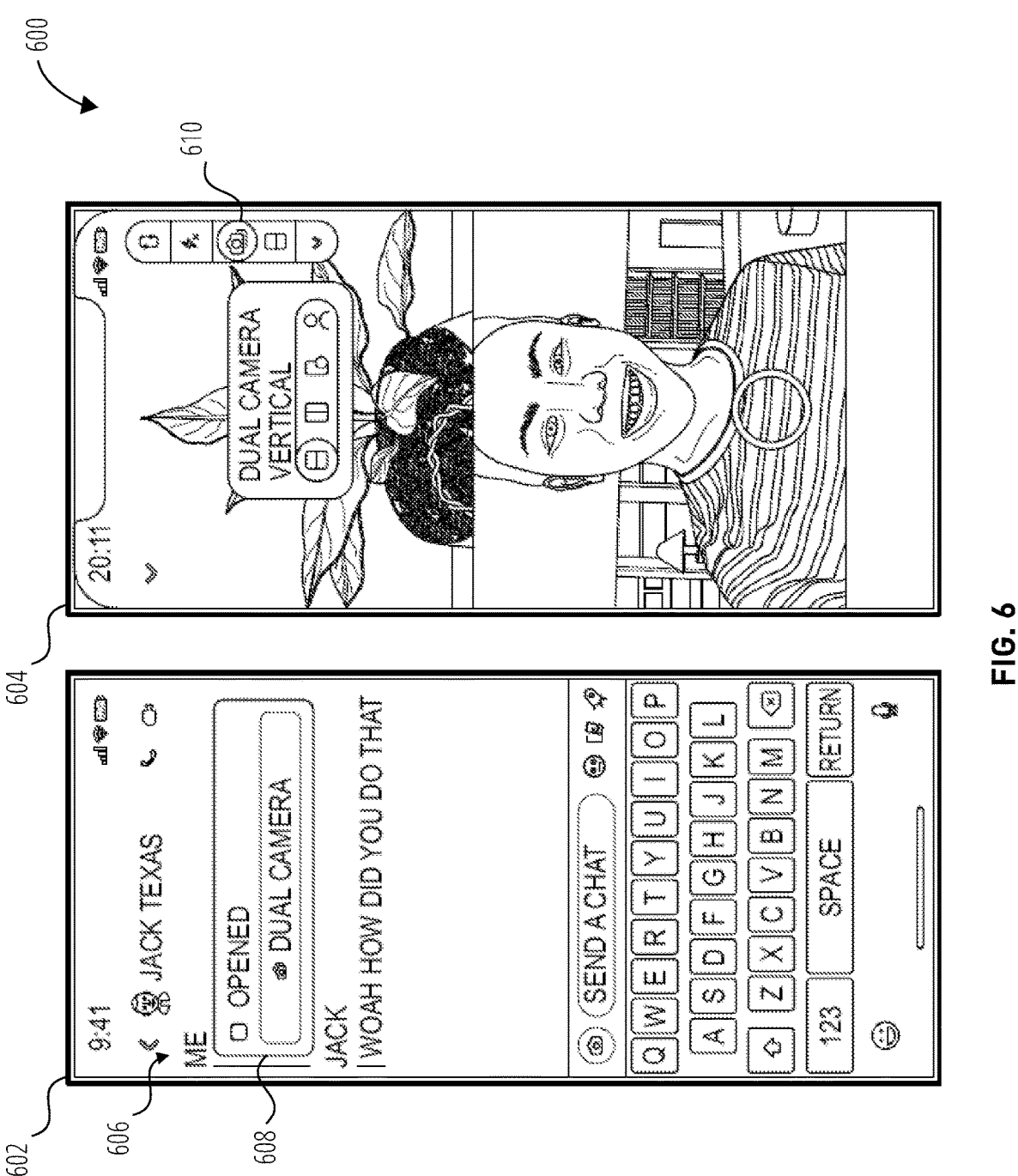
FIG. 6 is a flow diagram depicting GUIs to display a contextual creative tool, in accordance with one embodiment.

FIG. 5 is a flow diagram 500 depicting GUIs to display a contextual creative tool, in accordance with one embodiment, and as described in the methods 300 and 400.

As seen in the GUI 502, a client device 106 may cause display of media content 508, wherein the media content 508 comprises one or more media attributes. In some embodiments, the contextual creative tool system 214 may present a menu element 510 at a position upon the media content 508, within the GUI 502, wherein the menu element 510 includes a display of one or more messaging options. For example, a user of the client device 106 may provide an input to select an option from within the menu element 510 in order to respond to a sender of the media content 508.

Responsive to receiving a selection of the menu element 510, the contextual creative tool system 214 may cause display of the graphical icon 514 at a position upon the media content 508, as depicted in the GUI 504. For example, the graphical icon 514 may include a display of an indication of one or more media attributes associated with the media content 508, such as an indication of a creative tool utilized to generate the media content 508. As an illustrative example, the media attribute associated with the media content 508 may include a creative tool wherein multiple cameras associated with a client device are activated.

Responsive to receiving an input that selects the graphical icon 514, the contextual creative tool system 214 may cause the client device 106 to perform operations to generate second media content based on the media attribute associated with the media content 508, as seen in the GUI 506. For example, the media attribute may include a creative tool from among a plurality of creative tools. In some embodiments, the creative tool may include a creative tool wherein both a front-facing camera and rearward facing camera are activated, and image data generated by each is displayed within the GUI 506.

In some embodiments, the contextual creative tool systems 214 may present a menu element 512, wherein the menu element 512 comprises a display of one or more options related to the media attribute (i.e., creative tool) associated with the media content 508. For example, as seen in the GUI 506, the menu element 512 may provide one or more options to generate media content based on the media attribute associated with the media content 508.

FIG. 6 is a flow diagram 600 depicting GUIs to display a contextual creative tool, in accordance with one embodiment.

As seen in the GUI 602, a graphical icon 608 may be presented within a chat interface 606, wherein media content may be shared to a user of the client device 106 via the chat interface 606. Accordingly, subsequent to displaying the media content, such as the media content 508, the contextual creative tool system 214 may present the graphical icon 608 within the chat interface 606, as described in the methods 300 and 400.

Responsive to receiving an input that selects the graphical icon 608, the contextual creative tool system 214 may may cause the client device 106 to perform operations to generate second media content based on the media attribute indicated by the graphical icon 608.

Figure 7:
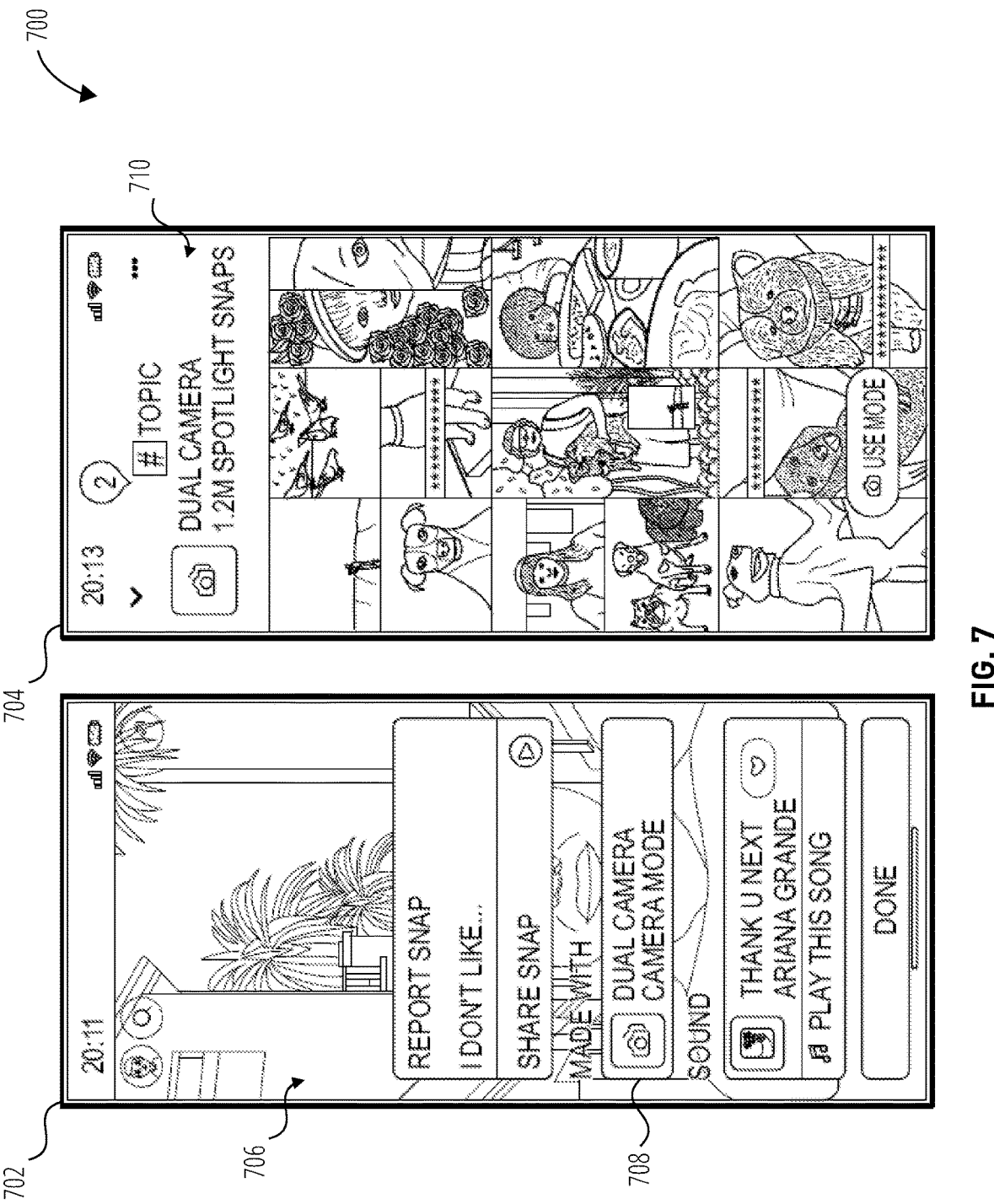
FIG. 7 is a flow diagram depicting GUIs to display a contextual creative tool, in accordance with one embodiment.

FIG. 7 is a flow diagram 700 depicting GUIs to display a contextual creative tool, in accordance with one embodiment.

As seen in the GUI 702, the contextual creative tool system 214 may present a graphical icon 708 at a position upon media content 706, wherein the graphical icon 708 includes a display of an indication of a media attribute associated with the media content 706, wherein the media attribute includes a creative tool utilized to generate the media content 706.

In some embodiments, responsive to receiving a selection of the graphical icon 708, the contextual creative tool system 214 may access a repository, such as the database 122, wherein the repository comprises media content generated based on the media attribute identified by the graphical icon 708. Accordingly, the contextual creative tool system 214 may present a display 710 of the media content generated based on the media attribute within the GUI 704.

In some embodiments, the media content presented within the display 710 may include media content generated by one or more friends or connections associated with a user of the client device 106. In some embodiments, the display 710 may comprise public media content generated by a plurality of users based on the media attribute.

Machine Architecture

Figure 8:
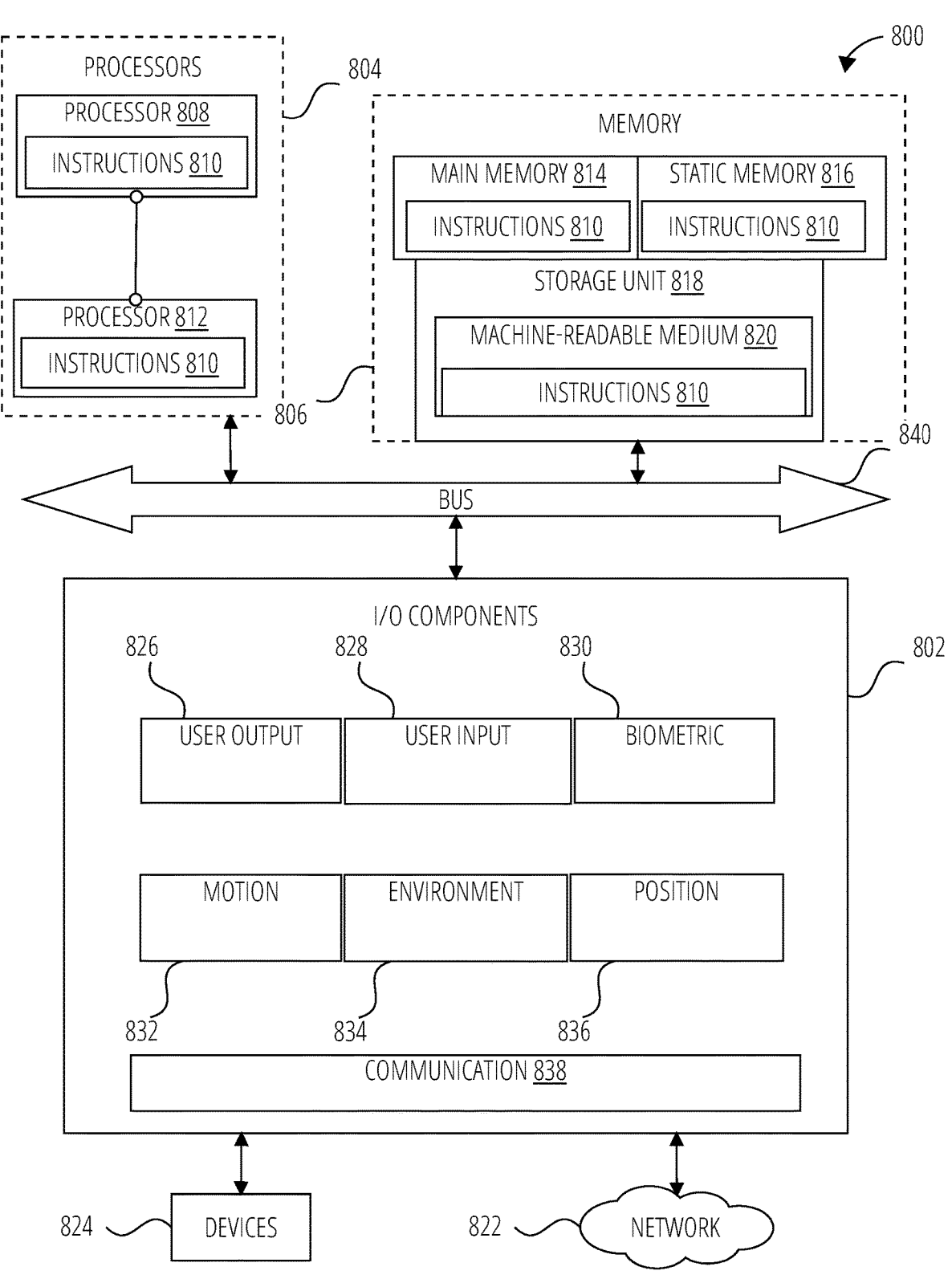
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the client device 106 or any one of a number of server devices forming part of the messaging server system 104. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 638, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
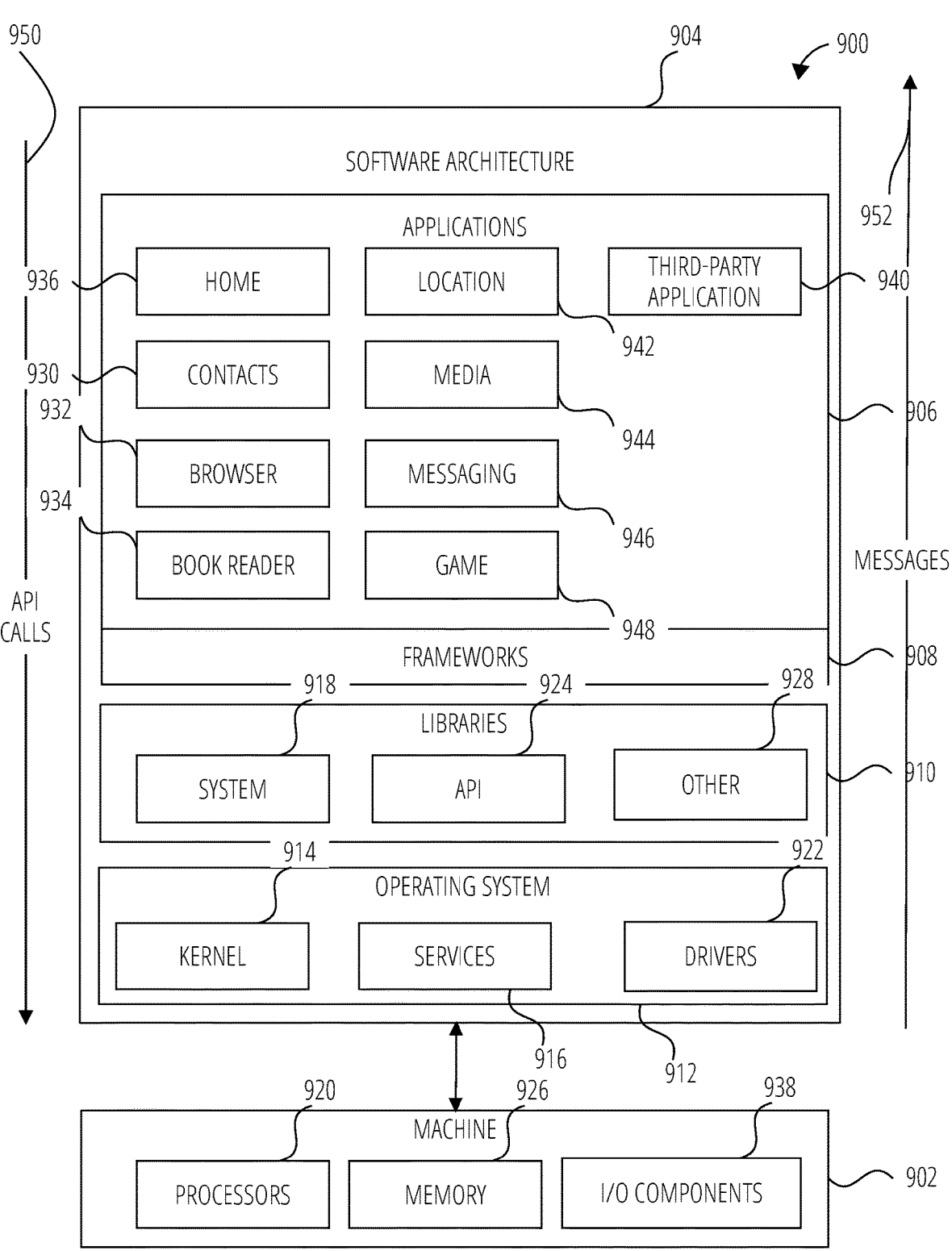
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Processing Components

Figure 10:
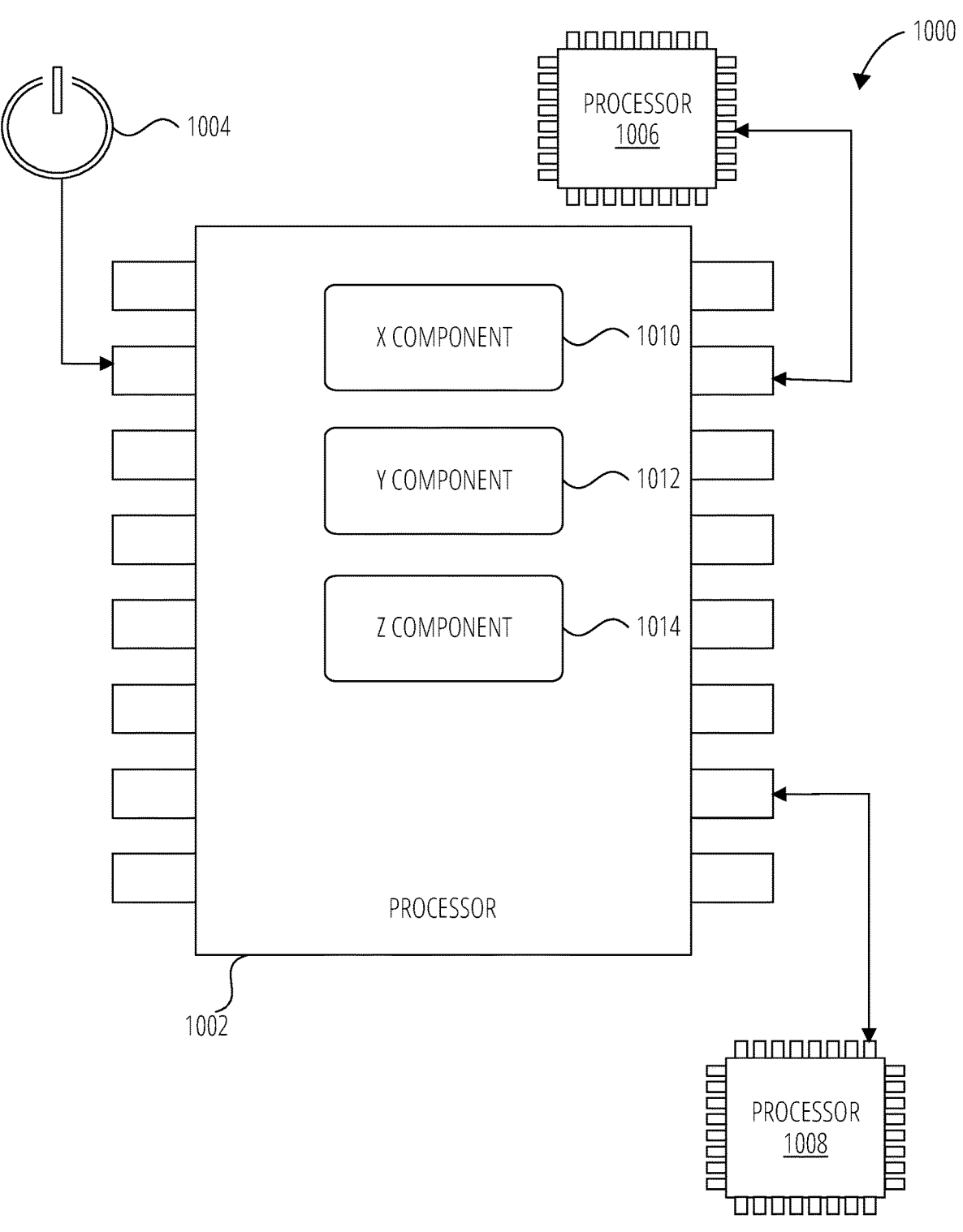
FIG. 10 is a diagrammatic representation of a processing environment, in accordance with some examples.

Turning now to FIG. 10, there is shown a diagrammatic representation of a processing environment 1000, which includes a processor 1002, a processor 1006, and a processor 1008 (e.g., a GPU, CPU or combination thereof).

The processor 1002 is shown to be coupled to a power source 1004, and to include (either permanently configured or temporarily instantiated) modules, namely an X component 1010, a Y component 1012, and a Z component 1014, operationally configured to perform operations as discussed in the method 300 of FIG. 3, and the method 400 of FIG. 4, in accordance with embodiments discussed herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium"

mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is provisionally claimed is:

1. A method comprising:
causing display of first media content at a client device, the first media content comprising a media attribute that includes a creative tool utilized to generate the first media content;
detecting the media attribute that includes the creative tool utilized to generate the first media content;
presenting a graphical icon that identifies the creative tool utilized to generate the first media content at the client device;
receiving an input that selects the graphical icon; and
generating second media content at the client device responsive to the input that selects the graphical icon based on the creative tool utilized to generate the first media content, the second media content comprising first image data generated by a first camera associated with the client device and second image data generated by a second camera associated with the client device.

2. The method of claim 1, wherein the media attribute includes a camera mode associated with the first media content.

3. The method of claim 1, wherein the graphical icon comprises an indication of the media attribute associated with the first media content.

4. The method of claim 1, wherein the media attribute is a first media attribute, and the presenting the graphical icon based on the media attribute of the first media content includes:
detecting a device attribute of the client device;
selecting a second media attribute from among a set of media attributes based on the device attribute of the client device and the first media attribute; and
generating the graphical icon based on the second media attribute, the graphical icon comprising an indication of the second media attribute; and
presenting the graphical icon at the client device.

5. The method of claim 1, wherein the presenting the graphical icon based on the media attribute of the first media content at the client device includes:
presenting the graphical icon at a position within a chat interface at the client device.

6. The method of claim 1, wherein the presenting the graphical icon based on the media attribute of the first media content at the client device includes:

presenting the graphical icon at a position upon the first media content at the client device.

7. A system comprising:
one or more processors of a machine; and
a memory storing instructions that, when executed by at least one processor among the one or more processors, causes the machine to perform operations comprising:
causing display of first media content at a client device, the first media content comprising a media attribute that includes a creative tool utilized to generate the first media content;
detecting the media attribute that includes the creative tool utilized to generate the first media content;
presenting a graphical icon that identifies the creative tool utilized to generate the first media content at the client device;
receiving an input that selects the graphical icon; and
generating second media content at the client device responsive to the input that selects the graphical icon based on the creative tool utilized to generate the first media content, the second media content comprising first image data generated by a first camera associated with the client device and second image data generated by a second camera associated with the client device.

8. The system of claim 7, wherein the media attribute includes a camera mode associated with the first media content.

9. The system of claim 7, wherein the graphical icon comprises an indication of the media attribute associated with the first media content.

10. The system of claim 7, wherein the media attribute is a first media attribute, and the presenting the graphical icon based on the media attribute of the first media content includes:
detecting a device attribute of the client device;
selecting a second media attribute from among a set of media attributes based on the device attribute of the client device and the first media attribute; and
generating the graphical icon based on the second media attribute, the graphical icon comprising an indication of the second media attribute; and
presenting the graphical icon at the client device.

11. The system of claim 7, wherein the presenting the graphical icon based on the media attribute of the first media content at the client device includes:
presenting the graphical icon at a position within a chat interface at the client device.

12. The system of claim 7, wherein the presenting the graphical icon based on the media attribute of the first media content at the client device includes:
presenting the graphical icon at a position upon the first media content at the client device.

13. A non-transitory machine-readable storage medium comprising instructions that, when executed by one or more processors of a machine, cause the machine to perform operations comprising:
causing display of first media content at a client device, the first media content comprising a media attribute that includes a creative tool utilized to generate the first media content;
detecting the media attribute that includes the creative tool utilized to generate the first media content;
presenting a graphical icon that identifies the creative tool utilized to generate the first media content at the client device;
receiving an input that selects the graphical icon; and generating second media content at the client device responsive to the input that selects the graphical icon based on the creative tool utilized to generate the first media content, the second media content comprising first image data generated by a first camera associated with the client device and second image data generated by a second camera associated with the client device.

14. The non-transitory machine-readable storage medium of claim 13, wherein the media attribute includes a camera mode associated with the first media content.

15. The non-transitory machine-readable storage medium of claim 13, wherein the graphical icon comprises an indication of the media attribute associated with the first media content.

16. The non-transitory machine-readable storage medium of claim 13, wherein the media attribute is a first media attribute, and the presenting the graphical icon based on the media attribute of the first media content includes:

detecting a device attribute of the client device;

selecting a second media attribute from among a set of media attributes based on the device attribute of the client device and the first media attribute; and generating the graphical icon based on the second media attribute, the graphical icon comprising an indication of the second media attribute; and presenting the graphical icon at the client device.

17. The non-transitory machine-readable storage medium of claim 13, wherein the presenting the graphical icon based on the media attribute of the first media content at the client device includes:

presenting the graphical icon at a position within a chat interface at the client device.

* * * * *